United States Patent
Blessing et al.

(10) Patent No.: US 11,203,237 B2
(45) Date of Patent: Dec. 21, 2021

(54) ASSEMBLY FOR A TIRE INFLATION SYSTEM

(71) Applicant: Dana Heavy Vehicle Systems Group, LLC, Maumee, OH (US)

(72) Inventors: Christopher D. Blessing, Toledo, OH (US); Jason M. Sidders, Perrysburg, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 343 days.

(21) Appl. No.: 16/357,807

(22) Filed: Mar. 19, 2019

(65) Prior Publication Data

US 2019/0283512 A1    Sep. 19, 2019

Related U.S. Application Data

(60) Provisional application No. 62/644,845, filed on Mar. 19, 2018, provisional application No. 62/718,772, filed on Aug. 14, 2018.

(51) Int. Cl.
| | |
|---|---|
| *B60C 23/10* | (2006.01) |
| *B60C 29/02* | (2006.01) |
| *B60C 29/00* | (2006.01) |
| *F16K 27/02* | (2006.01) |
| *F16K 15/20* | (2006.01) |

(52) U.S. Cl.
CPC ............ *B60C 29/02* (2013.01); *B60C 29/002* (2013.01); *F16K 15/202* (2013.01); *F16K 27/0236* (2013.01)

(58) Field of Classification Search
CPC .............................. B60C 29/02; B60C 29/002
USPC .......................................................... 152/415
See application file for complete search history.

(56) References Cited

U.S. PATENT DOCUMENTS

| | | | |
|---|---|---|---|
| 4,754,792 A | 7/1988 | Braun et al. | |
| 4,765,385 A | 8/1988 | McGeachy | |
| 4,805,681 A | 2/1989 | Vollmer et al. | |
| 4,877,048 A | 10/1989 | Oltean et al. | |
| 5,398,743 A | 3/1995 | Bartos | |
| 5,538,062 A * | 7/1996 | Stech | B60C 23/003 152/415 |
| 8,307,868 B2 | 11/2012 | Medley et al. | |
| 8,844,596 B2 | 9/2014 | Medley et al. | |
| 9,573,428 B2 | 2/2017 | Sidders et al. | |
| 2004/0238093 A1* | 12/2004 | Nelson | B60C 23/003 152/415 |
| 2008/0149243 A1* | 6/2008 | Resare | F16K 15/144 152/415 |
| 2011/0221261 A1* | 9/2011 | Eaton | B60C 23/003 301/5.24 |
| 2013/0199685 A1* | 8/2013 | Nelson | B60B 37/00 152/415 |
| 2016/0176243 A1* | 6/2016 | Lin | G05D 16/0655 152/429 |
| 2017/0036501 A1* | 2/2017 | Reinardt | B60C 29/04 |
| 2020/0231001 A1* | 7/2020 | Renson | B60C 29/06 |

* cited by examiner

*Primary Examiner* — Robert K Arundale
(74) *Attorney, Agent, or Firm* — McCoy Russell LLP

(57) ABSTRACT

An assembly for a tire inflation system includes a ring portion. The ring portion has an outer surface and an inner surface. A first projection and a second projection each extend from the inner surface. A valve assembly is connected to the ring portion and disposed in from the outer surface.

12 Claims, 17 Drawing Sheets

ASSEMBLY FOR A TIRE INFLATION SYSTEM

CROSS-REFERENCE TO RELATED APPLICATION

This application is claiming the benefit, under 35 U.S.C. 119(e), of a provisional patent application which was granted Ser. No. 62/644,845 and filed on Mar. 19, 2018, and a provisional patent application which was granted Ser. No. 62/718,772 and filed on Aug. 14, 2018, the entire disclosures of which are hereby incorporated by reference.

BACKGROUND

The invention relates to tire inflation systems. More particularly, the invention relates to an assembly for a tire inflation system.

Tire inflation systems for vehicles provide a vehicle the versatility of adjusting tire pressures while the vehicle is stationary or in motion. For example, the tire pressure of one or more wheel assemblies in fluid communication with a tire inflation system may be decreased to increase tire traction, or increased to reduce rolling resistance and increase the vehicle's fuel efficiency and tire life-span. In addition, tire inflation systems increase a vehicle's maneuverability over differing terrains and reduce maintenance requirements.

Tire inflation systems often employ a wheel valve assembly to communicate pressurized fluid to a wheel assembly, to retain fluid in a wheel assembly, and to adjust or maintain the pressure of a wheel assembly. Conventional wheel valves may suffer from poor fluid connection robustness, and negatively affect wheel balance. In view of the above, there remains a need for a wheel valve assembly having more robust fluid flow and a more secure package.

BRIEF SUMMARY

Embodiments of an assembly for a tire inflation system are described below. In an embodiment, the assembly comprises a ring portion. The ring portion has an outer surface and an inner surface. A first projection and a second projection each extend from the inner surface. A valve assembly is connected to the ring portion and disposed in from the outer surface.

BRIEF DESCRIPTION OF THE SEVERAL VIEWS OF THE DRAWINGS

The above, as well as other advantages of the present invention will become readily apparent to those skilled in the art from the following detailed description when considered in the light of the accompanying drawings in which.

DETAILED DESCRIPTION

Figure 1:
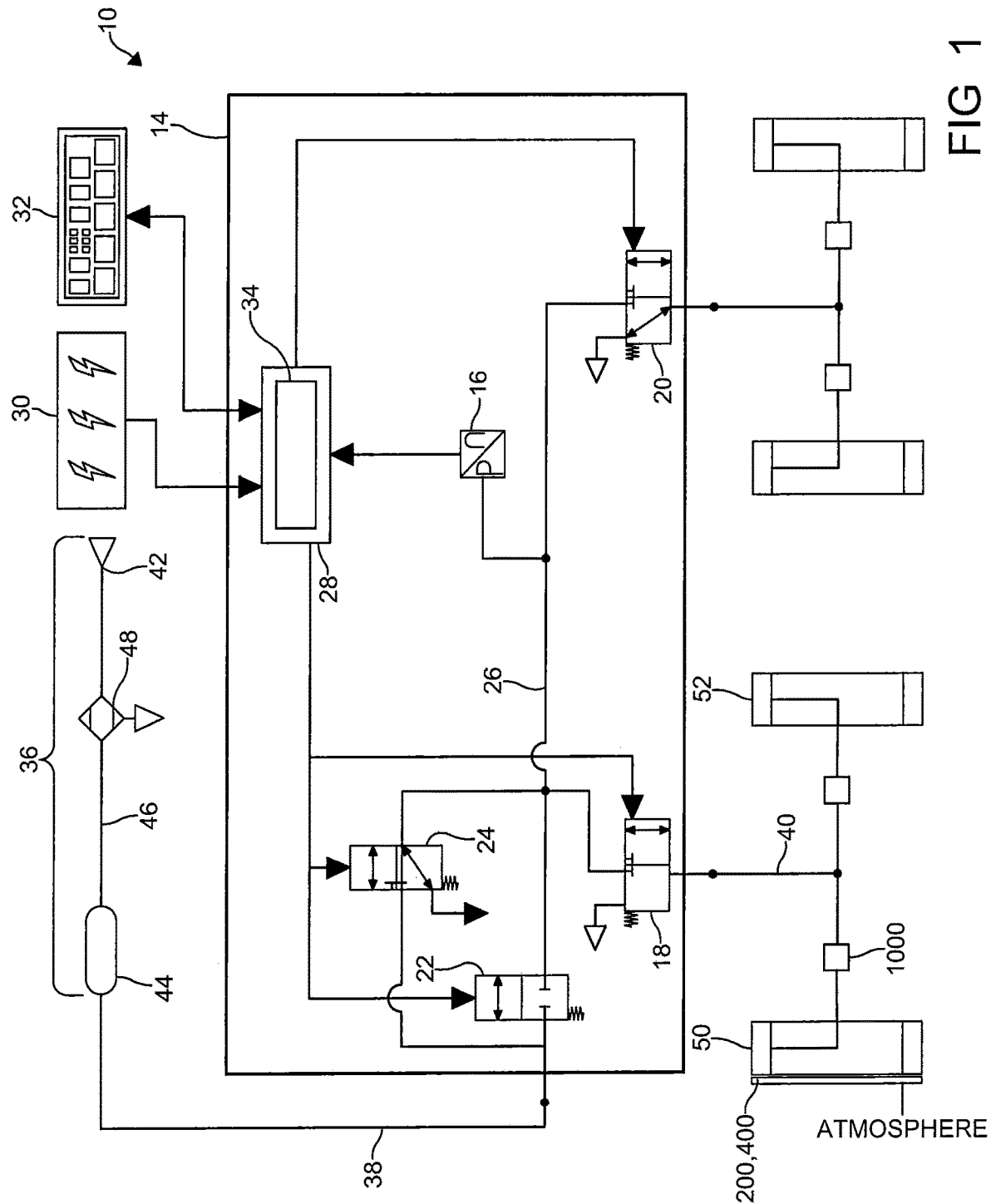
FIG. 1 is a schematic view of an embodiment of a tire inflation system.

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Embodiments of a tire inflation system 10 are described below. In certain embodiments, the tire inflation system 10 is utilized with a vehicle (not depicted). The tire inflation system 10 may be a central tire inflation system (CTIS) for a commercial vehicle or a passenger vehicle. Further, the tire inflation system 10 described herein may have applications in both light duty and heavy duty vehicles, and for passenger, commercial, and off-highway vehicles. It would be understood by one of ordinary skill in the art that the tire inflation system 10 has industrial, locomotive, military, agricultural, and aerospace applications.

A schematic depiction of an embodiment of the tire inflation system 10 is illustrated in FIG. 1. The tire inflation system 10 is described herein with reference to a pressurized fluid such as, for example, air. The tire inflation system 10 may have inflate and/or deflate capability to allow a tire pressure to be increased and/or decreased.

The tire inflation system 10 may comprise a control unit 14. The control unit 14 comprises a pressure sensor 16 for measuring the pressure of air. In an embodiment, the control unit 14 also comprises a plurality of valve assemblies 18, 20, 22, 24, which may be of the solenoid variety, and a first control unit conduit 26 for controlling the flow of, and directing, air through the system 10.

It will be understood by those familiar in the relevant art that the control unit 14 may comprise a mechatronic control unit (MCU) or a pneumatic control unit (PCU), but is not limited thereto.

The control unit 14 also comprises an electronic control portion 28. The electronic control portion 28 may receive input signals from the pressure sensor 16, a power supply 30 and one or more additional sensors (not depicted) such as, for example, a load sensor and a speed sensor. The electronic control portion 28 may also receive input signals from an operator control device 32. The electronic control portion 28 may include a microprocessor 34 operating under the control of a set of programming instructions, which may also be referred to as software. The electronic control portion 28 may include a memory (not depicted) in which programming instructions are stored. The memory can also store identification codes, tire pressure records and/or user inputs over a period of time.

The electronic control portion 28 may output signals to the valve assemblies 18, 20, 22, 24 to open or close the valve assemblies 18, 20, 22, 24. The electronic control portion 28 may also output signals to a display device (not depicted). The display device may be included as a part of the operator control device 32 or may be included in a freestanding device.

The control unit 14 selectively communicates with an air supply 36 via an air supply circuit 38. The pressure sensor 16 measures the pressure of the air supply 36 via the air supply circuit 38 and the first control unit conduit 26. The control unit 14 may also comprise a control valve assembly 24. The control valve assembly 24 is provided with an orifice (not depicted) which is smaller than the orifice of the supply valve assembly 22 and is utilized to provide a bleed of air from the air supply 36 to a fluid control circuit 40. In an embodiment, the supply valve assembly 22 and control valve assembly 24 are of the solenoid variety.

The air supply 36 is utilized to check the tire pressure and, if needed, increase and/or decrease the tire pressure. The air supply 36 comprises an air compressor 42 attached to the vehicle. In an embodiment, the air supply 36 also comprises a reservoir 44 such as, for example, a wet tank. The compressor 42 is in fluid communication with the reservoir 44 via a supply conduit 46. The air compressor 42 supplies pressurized air to the reservoir 44 for storage therein. Pressurized air from the air supply 36 is provided to the air supply circuit 38 via the reservoir 44. In certain embodiments, a drier 48 is provided for removing water from the air supply 36. A filter (not depicted) may also be interposed in the air supply circuit 38 or the supply conduit 46.

The control unit 14 is also selectively in fluid communication with the fluid control circuit 40. The fluid control circuit 40 is utilized to provide fluid communication between the control unit 14 and one or more tires 50, 52. In an embodiment, fluid communication between the control unit 14 and fluid control circuit 40 is controlled by opening or closing a channel valve assembly 18.

Each tire 50, 52 is sealingly engaged with a wheel rim. A tire 50, 52 and a wheel rim are provided as portions of a wheel assembly. Each tire 50, 52 contains air at a certain pressure which will hereinafter be referred to as tire pressure. In an embodiment, the tire pressure is equal to a target tire pressure. The target tire pressure can be selected to be a desired pressure. After the target tire pressure is selected, it is programmed into the control unit 14. If it is determined that the tire pressure is less than the target tire pressure, the tire pressure can be increased. If it is determined that the tire pressure is greater than the target tire pressure, the tire pressure can be decreased. The tire inflation system 10 will be described below with reference to the tire pressure of one tire 50. However, the tire inflation system 10 may be in fluid communication with a plurality of tires.

Figure 2:
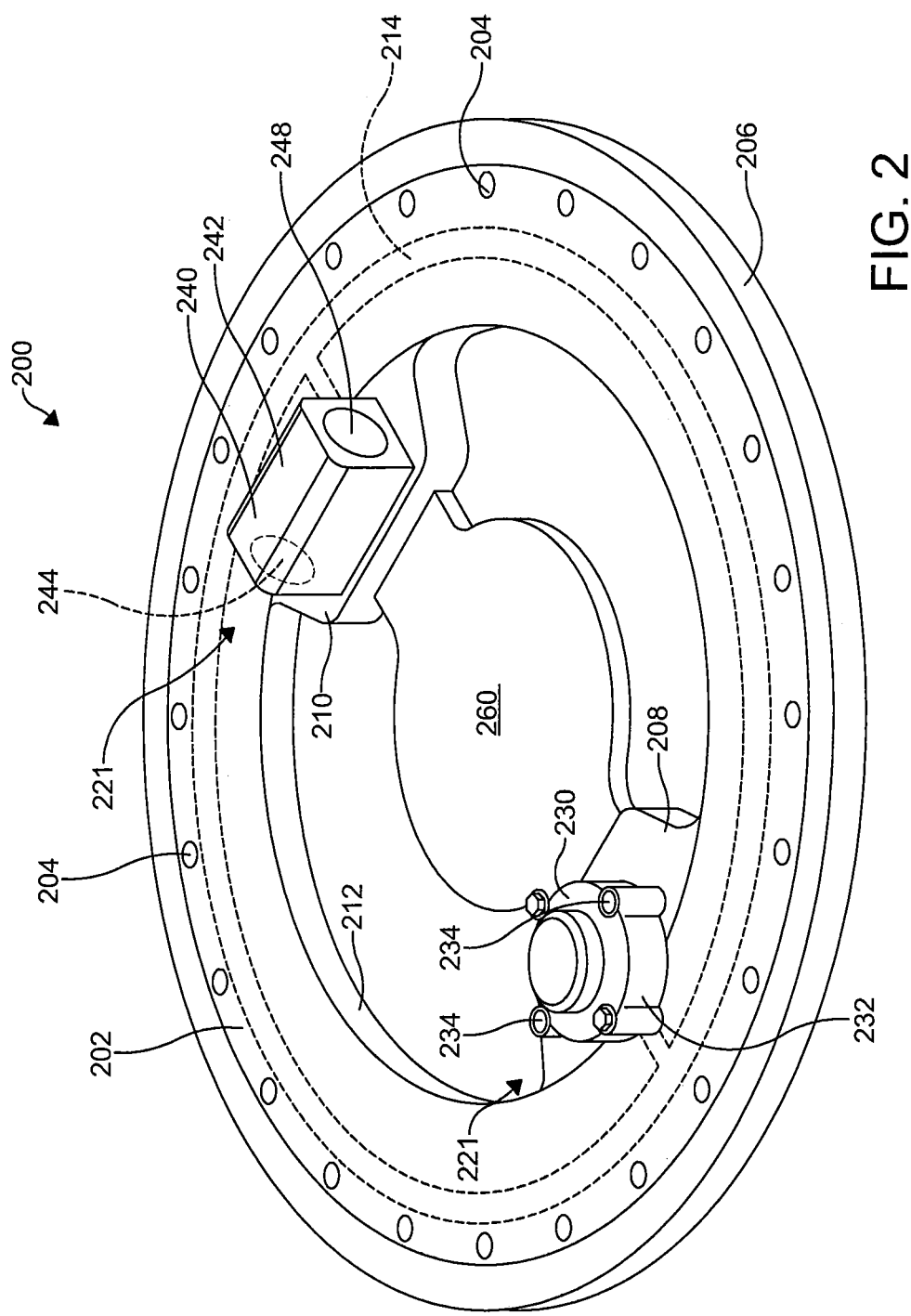
FIG. 2 is a rear isometric view of an embodiment of an assembly in accordance with the invention.
Figure 4:
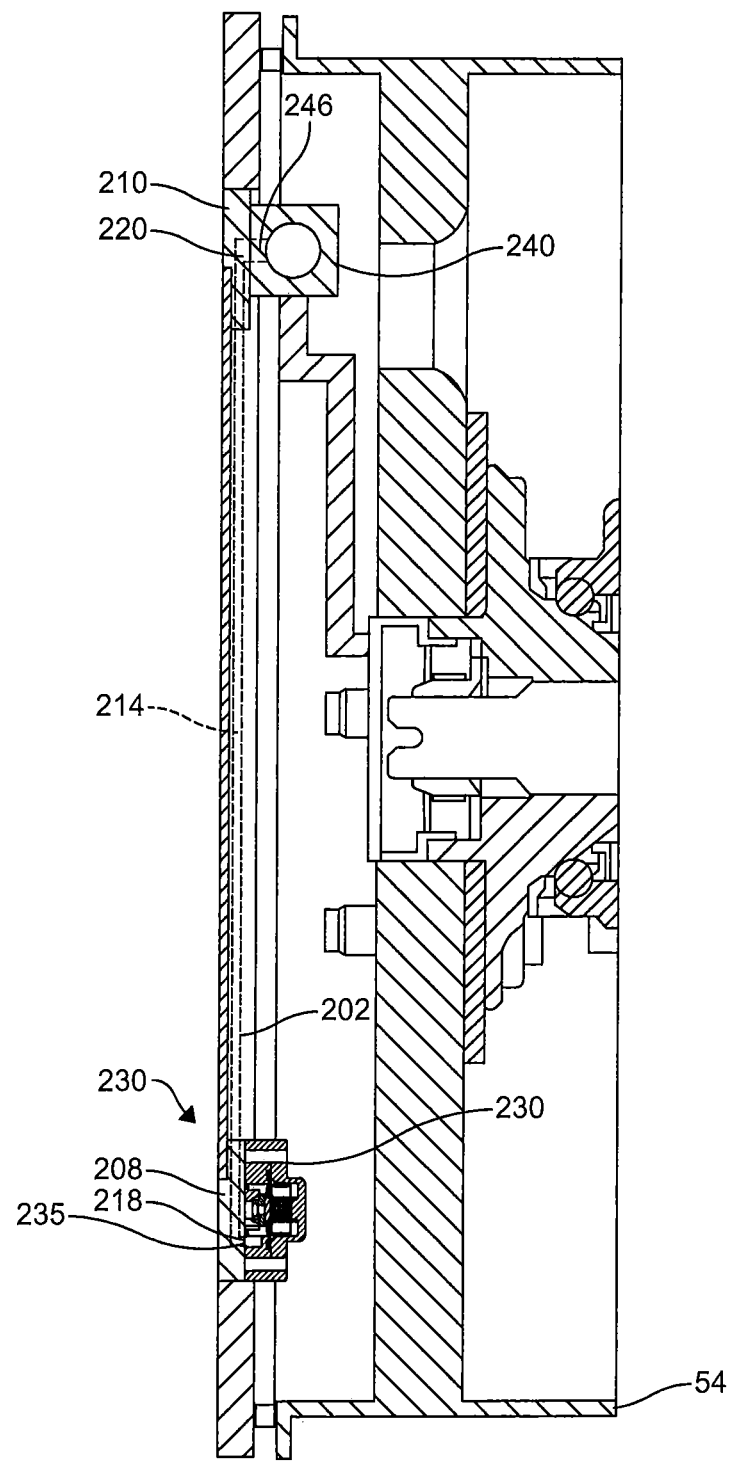
FIG. 4 is sectional view of the assembly of FIG. 2 coupled with a wheel end assembly of the tire inflation system of FIG. 1.

An assembly 200, 400 for the tire inflation system 10 may be associated with the tire 50. Referring now to FIG. 2, in an embodiment, the assembly 200 is coupled with a wheel rim 54, which is illustrated in FIG. 4. The assembly 200 may comprise a ring portion 202. The ring portion 202 may include a plurality of apertures 204 extending axially therethrough. The assembly 200 may be coupled with the wheel rim 54 via a plurality of fasteners 406. Preferably, each fastener is disposed through an aperture 204. In an embodiment, the apertures 204 are equally spaced apart about the ring portion 202. The apertures 204 may be spaced so that the apertures are arranged in a circle about the ring portion 202. In this embodiment, the circle has a diameter that is less than a diameter of an outer surface 206 of the ring portion 202.

The assembly 200 may also comprise a first projection 208 and a second projection 210. In an embodiment, the first projection 208 may extend radially inward from a inner surface 212 of the ring portion 202. The second projection 210 may extend radially inward from the inner surface 212. The first projection 208 and the second projection 210 may be circumferentially spaced apart along the inner surface 212. In an embodiment, the second projection 210 is provided across from the first projection 208. In this embodiment, the first projection 208 and the second projection 210 extend toward each other.

Figure 3:
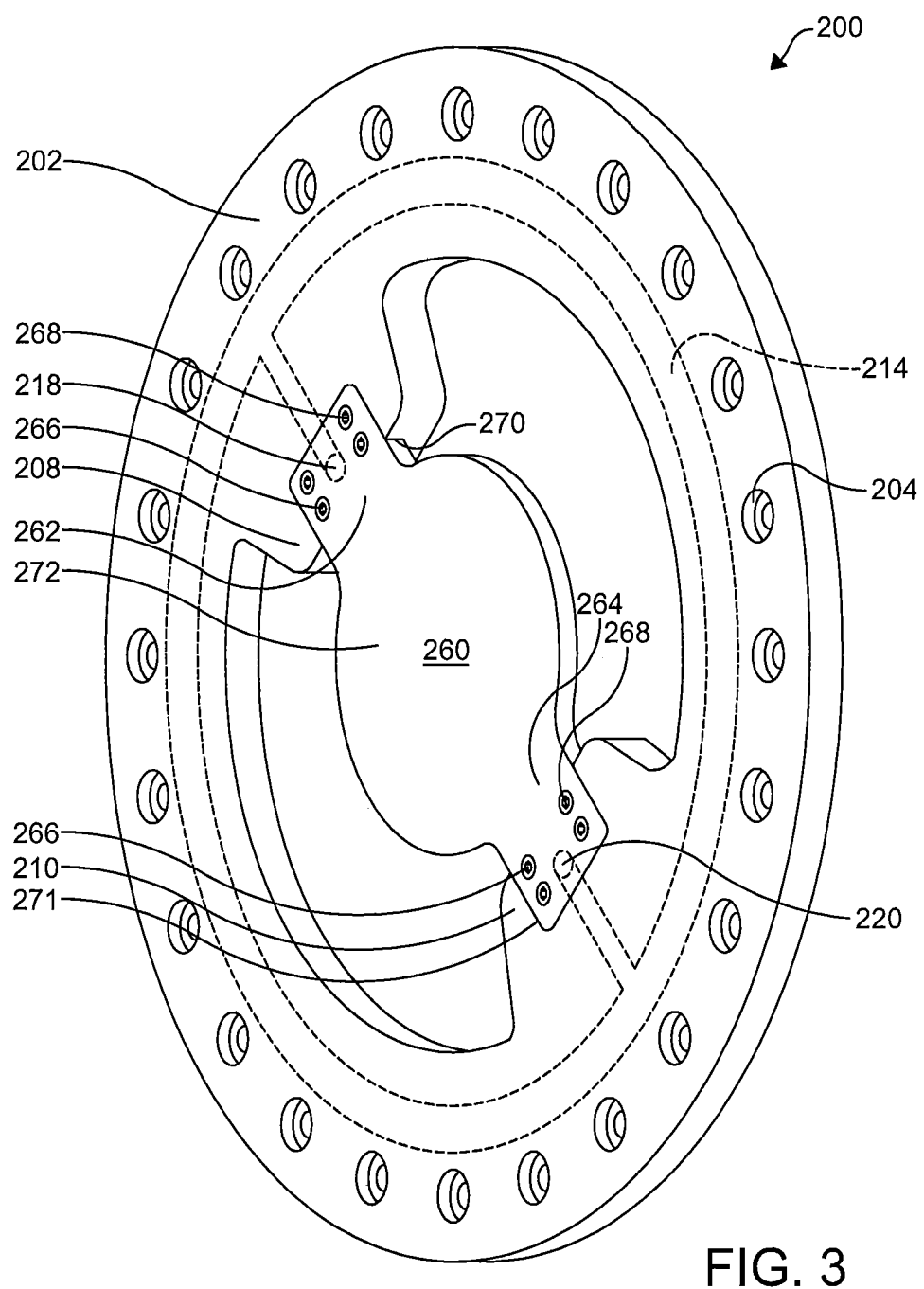
FIG. 3 is a front isometric view of the assembly of FIG. 2.
Figure 5:
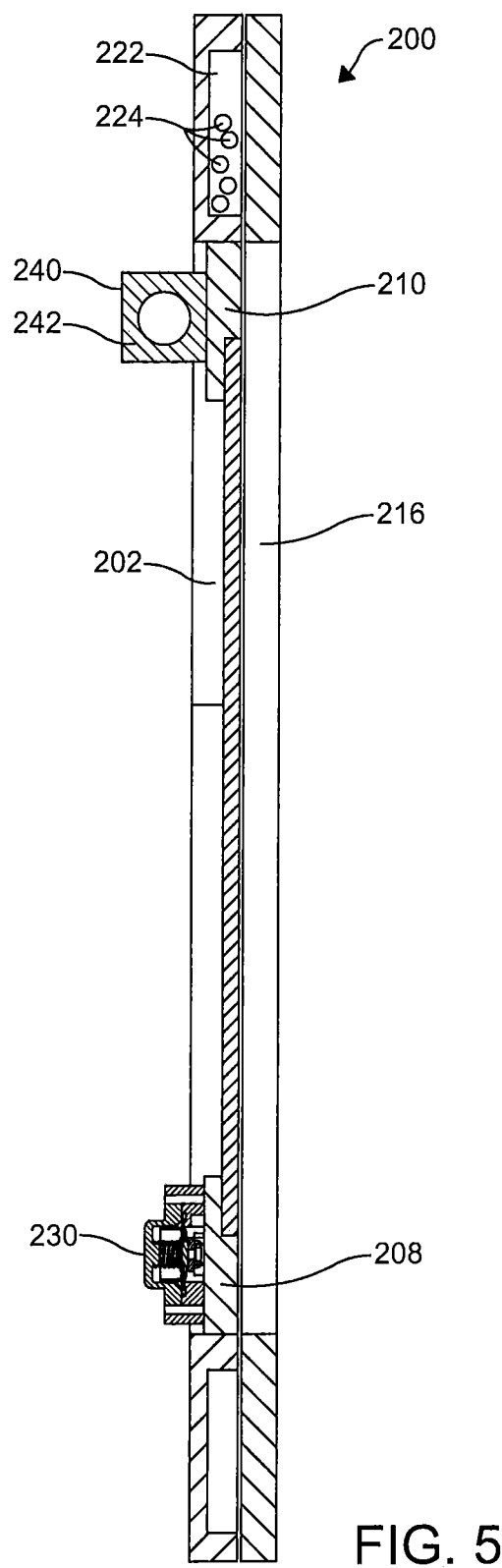
FIG. 5 is a sectional view of another embodiment of an assembly in accordance with the invention.

As illustrated in FIGS. 2-4, the ring portion 202 may comprise a fluid conduit 214. In an embodiment, the fluid conduit 214 may be formed within the ring portion 202. The fluid conduit 214 may be formed by a machining, etching, another process, or otherwise manufactured in the ring portion 202. In another embodiment, the fluid conduit may be defined by the ring portion 202 and a cover portion 216, which is illustrated in FIG. 5. In this embodiment, the cover portion 216 is coupled with the ring portion 202. In yet another embodiment (not depicted), the fluid conduit may comprise a tube or hose fitted into a groove disposed in an inboard surface of the ring portion. As illustrated best in FIG. 3, the fluid conduit 214 may comprise a first port 218 disposed in the first projection 208, and a second port 220 disposed in the second projection 210. In an embodiment, the first port 218 is disposed in an outboard surface of the first projection 208 and the second port 220 is disposed in an outboard surface of the second projection 210.

In some embodiments, the assembly 200, 400 comprises a valve assembly 221, 300, 473. In some embodiments, like the one illustrated in FIG. 6, the valve assembly 300 may be formed in a unitary manner. In other embodiments, like the ones illustrated in FIGS. 2-5, the valve assembly 221 may be provided as separate portions 230, 240. As illustrated best in FIGS. 2 and 5, in an embodiment, first portion 230 is coupled with the first projection 208. In an embodiment, the first portion 230 comprises a valve body 232, which is illustrated best in FIG. 2. The valve body 232 defines a first pair of fastener apertures 234. The first pair of fastener apertures 234 may be located at generally opposite positions near an outer surface of the valve body 232. One or more fasteners (not depicted) may be disposed through the first pair of fastener apertures 234 to couple the first portion 230 with the first projection 208. In some embodiments, the first portion 230 may also comprise a control port 235, which is illustrated in FIG. 4. The control port 235 is provided in the valve body 232. Preferably, the control port 235 is positioned to be adjacent to the ring portion 202. In these embodiments, it is preferred that the control port 235 is in fluid communication with the first port 218.

Preferably, in the embodiments illustrated in FIGS. 2-5, the second portion 240 is coupled with the second projection 210. The second portion 240 may comprise a housing 242. In an embodiment, the housing 242 may define an inlet 244 in fluid communication with the air supply 36 via a rotary joint 1000. The housing 242 may also define a port 246, which is illustrated in FIG. 4, in fluid communication with the second port 220 disposed in the second projection 210. The fluid conduit 214 facilitates selective fluid communication between the first portion 230 and the second portion 240. In addition, the second portion 240 may comprise a vent to atmosphere 248. Having the vent to atmosphere 248 disposed at the wheel end helps to remove undesirable back pressure in the fluid control circuit 40. Fluid control circuits only having a vent to atmosphere at a control unit may experience a decrease in performance. For example, back pressure in the fluid control circuit 40 may prevent the first portion 230 of the valve assembly 221 from closing when such an action is desirable. By removing the back pressure in the fluid control circuit 40 the first portion 230 is able to close a higher pressures.

Additionally, the second portion 240 may be arranged to provide a counter-balance to the first portion 230. As illustrated in FIG. 5, in an embodiment, a chamber 222 may be provided in the ring portion 202 adjacent to the second projection 210. One or more weights 224 may be added to the chamber 222 to facilitate a balancing of the assembly 200. Each weight 224 may comprise a material that is more dense than the material used to form the ring portion 202, and each weight 224 may be of any geometry that is complimentary to the chamber 222. In certain embodiments, the chamber 222 may be annular.

In some embodiments, the assembly 200 may comprise a center portion 260. As illustrated in FIG. 3, the center portion 260 may comprise first radially extending projection 262 and a second radially extending projection 264. The first and second projections 262, 264 may be disposed opposite one another and extend away from each other. Preferably, the first radially extending projection 262 is received in a recess 270 formed in the first projection 208 and the second radially extending projection 264 is received in a recess 271 formed in the second projection 210. Preferably, each recess 270, 271 has a geometry that is complimentary to the geometry of the center portion first and second radially extending projections 262, 264. Each of the first and second radially extending projections 262, 264 may comprise one or more fastener apertures 266. Fasteners 268 disposed through the one or more fastener apertures 266 may couple the center portion 260 to the ring portion 202. More particularly, the fasteners 268 couple the first radially extending projection 262 to the first projection 208 and the second radially extending projection 264 to the second projection 210. When the center portion 260 is coupled with the first projection 208 and the second projection 210, an outboard surface 272 of the center portion 260 may be aligned with the outboard surface of the ring portion 202.

Figure 6:
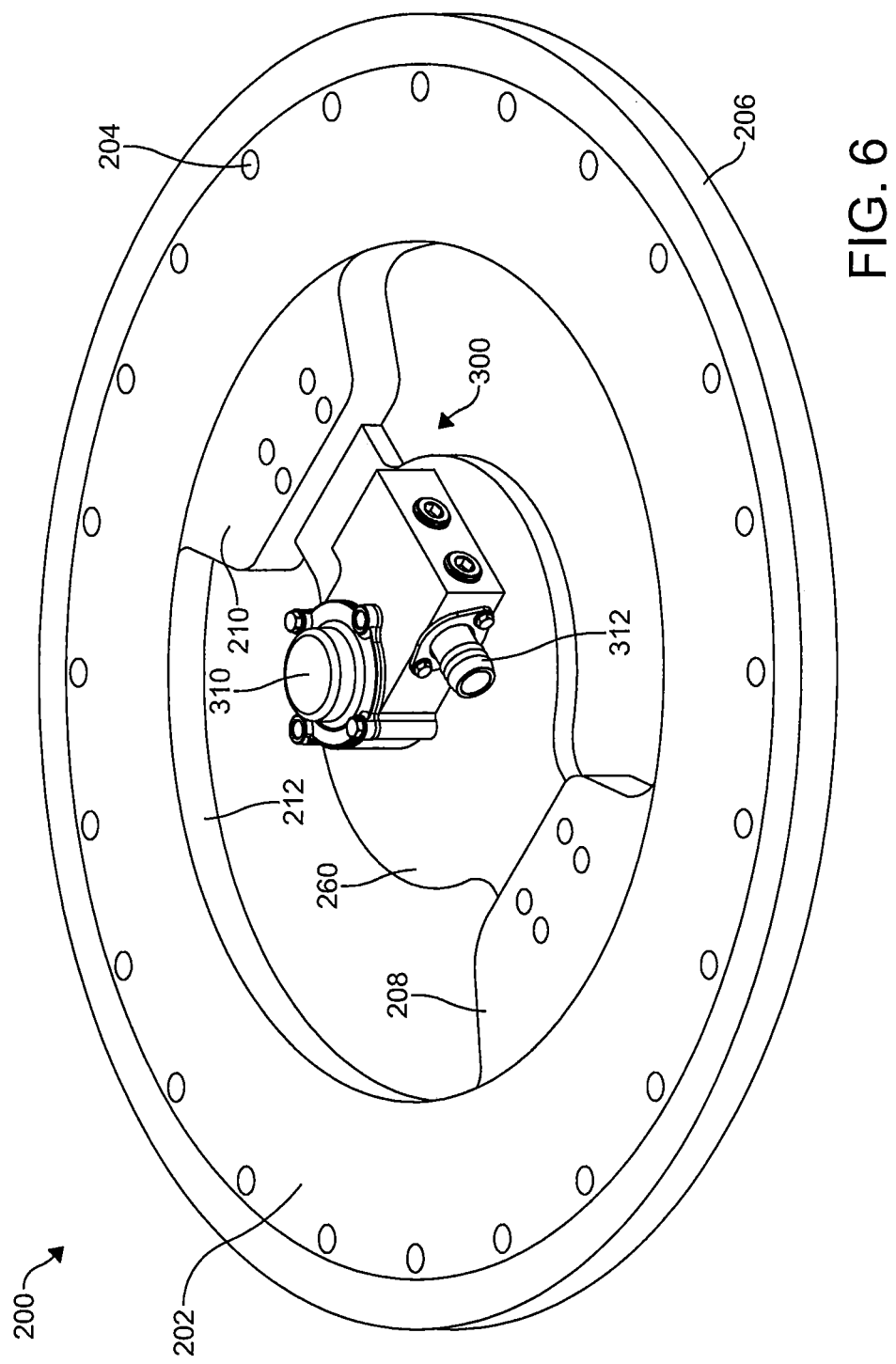
FIG. 6 illustrates a isometric view of another embodiment of an assembly in accordance with the invention.
Figure 6A:
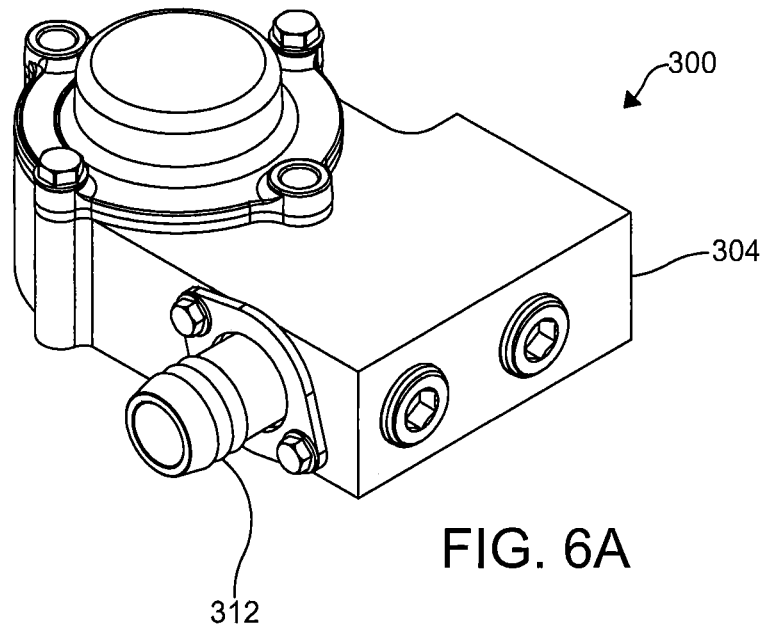
FIG. 6A illustrates isometric view of an embodiment of a valve assembly in accordance with the invention.
Figure 6B:
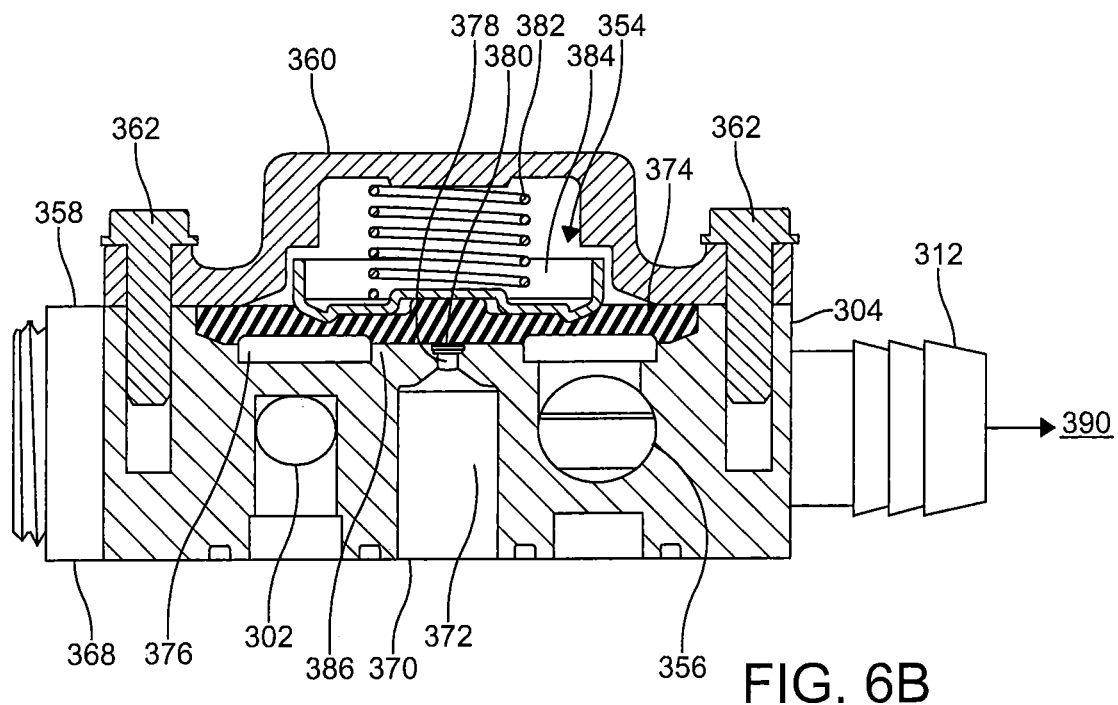
FIG. 6B illustrates a sectional view of the valve assembly of FIG. 6A.

In some embodiments, like the one illustrated in FIG. 6, the valve assembly 300 is formed in a unitary manner and coupled with the center portion 260. In other embodiments (not depicted), the unitarily formed valve assembly 300 may be coupled to another portion of the tire inflation system or a wheel assembly.

Figure 6C:
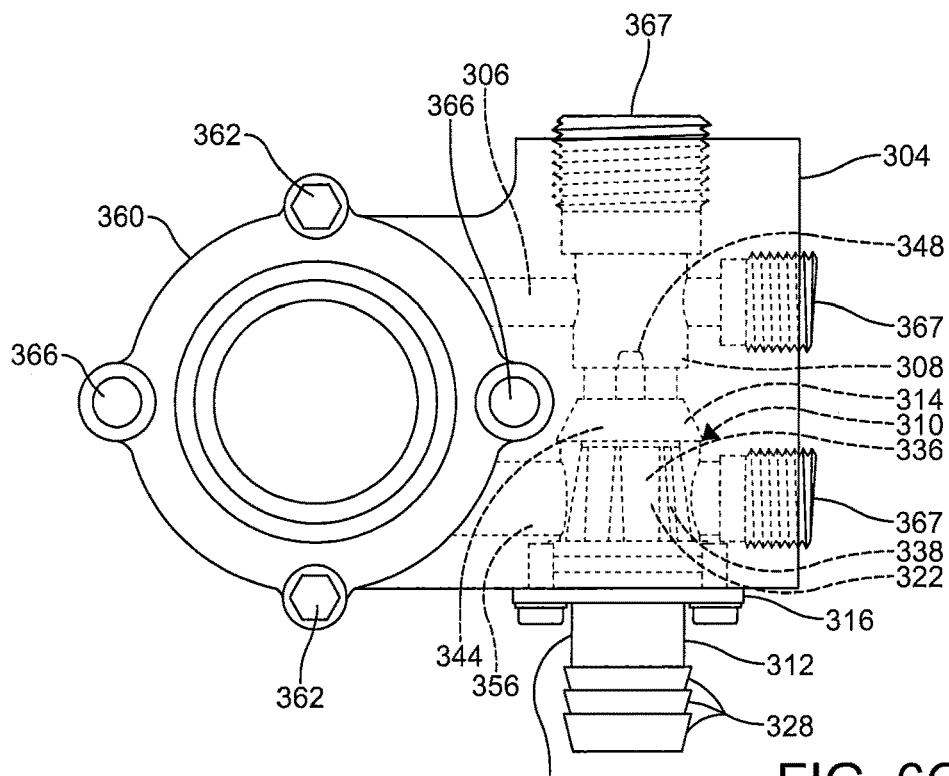
FIG. 6C illustrates top view of the valve assembly of FIG. 6A showing certain hidden lines.

Referring now to FIGS. 6A-6E, in some embodiments, the fluid control circuit 40 is in fluid communication with the valve assembly 300 via a control port 302. The control port 302 is formed in a housing 304. The control port 302 is in fluid communication with a control conduit 306 disposed entirely within in the housing 304. The control conduit 306 is in fluid communication with a first chamber 308, which is illustrated in FIG. 6C.

The first chamber 308 is in fluid communication with a first portion 310 of the valve assembly 300. The first portion 310 is utilized to direct pressurized air to a tire when the tire pressure is being increased or direct pressurized air from the tire to atmosphere when the tire pressure is being decreased.

The first portion 310 may comprise an exhaust stem 312, a valve 314, and a retaining member 316. The exhaust stem 312 is disposed in and sealingly engaged with the housing 304. The valve 314 is movably and disposed between the housing 304 and the exhaust stem 312. The retaining member 316 is coupled to the housing 304 and secures the exhaust stem 312 to the housing 304. As illustrated, the exhaust stem 312 is disposed at least partially within the housing 304. The valve 314 may operate in a first state or a second state. In the first state, the valve 314 prevents fluid communication between the control port 302 and an outlet of the exhaust stem 312. In the second state, the valve 314 permits fluid communication between a tire port 370 and the outlet of the exhaust stem 312.

Figure 6D:
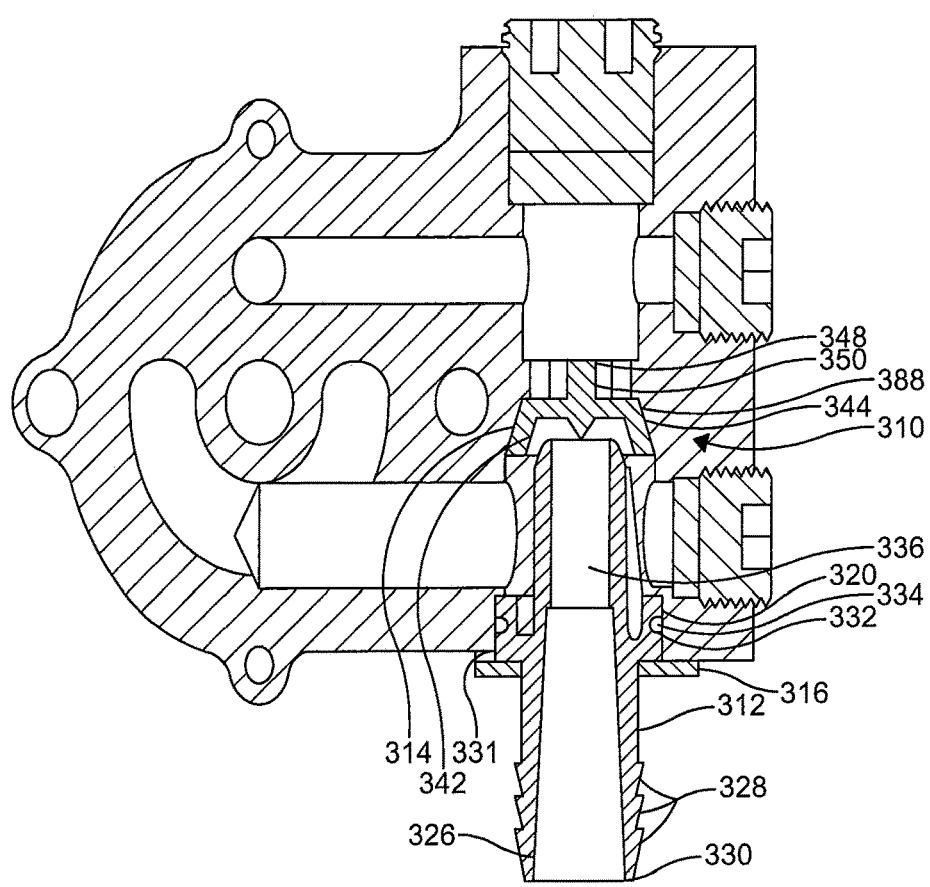
FIG. 6D illustrates sectional view through a portion of the valve assembly of FIG. 6A with certain portions removed for clarity.
Figure 6E:
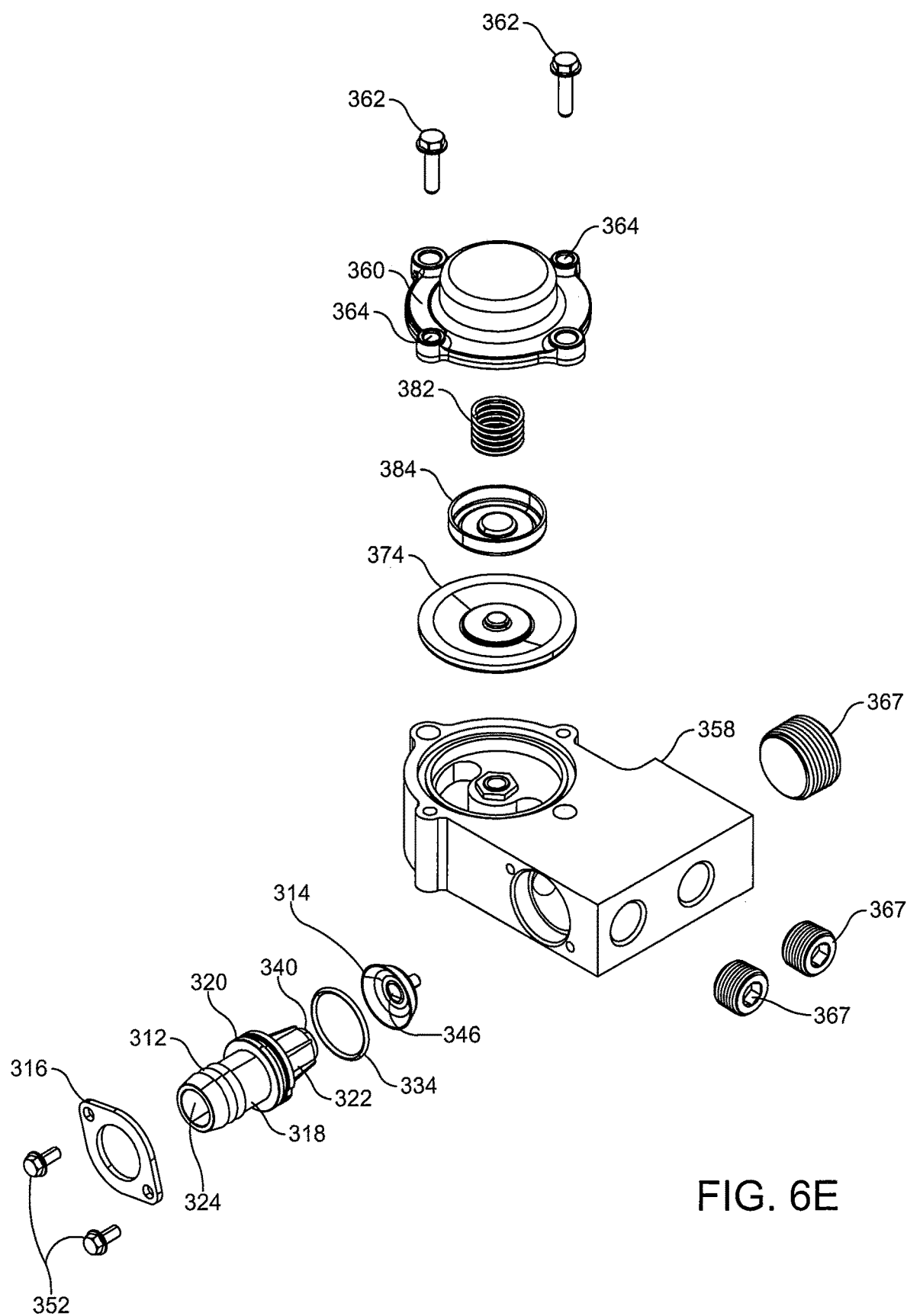
FIG. 6E illustrates an exploded view of the valve assembly of FIG. 6A.

FIGS. 6C-6E best illustrate the exhaust stem 312 of the first portion 310. The exhaust stem 312 may be unitarily formed by molding a plastic. In other embodiments, the exhaust stem 312 may be formed from another rigid material such as a metal using any other process. Alternately, it is understood that the exhaust stem 312 may comprise a plurality of components which are coupled to one another.

The exhaust stem 312 includes a first end portion 318, a middle portion 320, and a second end portion 322. The exhaust stem 312 is a hollow body defining a cavity 324. The cavity 324 extends from the first end portion 318 to the second end portion 322. The cavity 324 forms a portion of a fluid conduit, which terminates at the outlet of the exhaust stem 312.

The first end portion 318 is a hollow cylindrical shaped portion of the exhaust stem 312. An outer surface 326 of the first end portion 318 defines a plurality of annular barbs 328 adjacent a first distal end 330 of the exhaust stem 312. As shown in FIG. 6C, the first end portion 318 comprises three annular barbs 328. Each of the barbs 328 may have a triangular cross-section. However, each of the barbs 328 may have a cross-section of another shape. An exhaust conduit (not depicted) may be disposed over the annular barbs 328 to facilitate sealing engagement between the exhaust stem 312 and the exhaust conduit. A clamping device (not shown) may be disposed over the exhaust conduit to apply a radially inward force against the first end portion.

The middle portion 320 is a hollow ring shaped portion of the exhaust stem 312. The middle portion 320 has a diameter greater than a diameter of the first end portion 318. An outer surface 331 of the middle portion 320 defines an annular recess 332. As shown best in FIG. 6D, an O-ring 334 is disposed within the annular recess 332. When the exhaust stem 312 is disposed within the housing 304, the O-ring 334 facilitates sealing engagement between the exhaust stem 312 and the housing 304.

The second end portion 322 is a hollow, substantially conical shaped portion of the exhaust stem 312. An outer surface 336 of the second end portion 322 defines a plurality of turbulence reducing protuberances 338 extending from adjacent a second distal end 340 of the exhaust stem 312 to the middle portion 320. Preferably, the turbulence reducing protuberances 338 are equally spaced from each other about the second end portion 322. However, the plurality of turbulence reducing protuberances 338 may be spaced in another manner that results in a more evenly distributed application of a fluid around the second end portion 322. The second distal end 340 is a hollow, conical shaped portion of the exhaust stem 312 adapted to be sealingly engaged with the valve 314.

Each of the turbulence reducing protuberances 338 may have a trapezoidal cross-section having a height that decreases as each of the turbulence reducing protuberances 338 approaches the second distal end 340. However, each of turbulence reducing protuberances 338 may have a cross-section of another shape. Further, it is understood that the housing 304 may include turbulence reducing features (not shown) in addition to the turbulence reducing protuberances 338 of the second end portion 322 or that solely one of the housing 304 and the second end portion 322 may include the turbulence reducing features and the turbulence reducing protuberances 338, respectively. The second end portion 322 including the turbulence reducing protuberances 338 is disposed within the housing 304 when the first portion 310 is assembled.

The valve 314 is formed from a resilient material, preferably an elastomeric material. The valve 314 is most clearly shown in FIGS. 6C-6E. The valve 314 comprises an inner surface 342 and an outer surface 344. When the first portion 310 is assembled, the valve 314 is movably disposed between the housing 304 and the exhaust stem 312. The valve 314 may be moved from the first state to the second state and from the second state to the first state.

The inner surface 342 defines a substantially bowl shaped depression having a centrally positioned conical protuberance 346. When the valve 314 is placed in the first state, the inner surface 342 is sealingly engaged with the second distal end 340 of the exhaust stem 312.

The outer surface 344 defines a substantially frustoconical shaped portion of the valve 314 having a centrally positioned cylindrical protuberance 348. When the valve 314 is in the second state, the centrally positioned cylindrical protuberance 348 may be at least partially disposed within a guide aperture 350. Further, when the valve 314 is in the second state, the inner surface 342 is spaced apart from the second distal end 340 of the exhaust stem 312.

The housing 304 receives the valve 314 and the exhaust stem 312 when the first portion 310 is assembled. As shown in FIG. 6E, the retaining member 316 is coupled to the housing 304 and secures the exhaust stem 312 thereto using a pair of threaded fasteners 352. It should be understood that the retaining member 316 may be coupled to the housing 304 in any conventional manner. In an embodiment, the housing 304 is formed from a metal. However, the housing 304 may be formed from any rigid material and may comprise additional features.

The first portion 310 is in fluid communication with a second portion 354 of the valve assembly 300 via a fluid conduit 356. The fluid conduit 356 is disposed entirely within in the housing 304. The second portion 354 prevents fluid communication between a tire port 370 and the first portion 310 or permits fluid communication between the tire port 370 and the first portion 310.

The second portion 354 is disposed in the housing 304 between a base portion 358 and a cover portion 360. The base portion 358 and the cover portion 360 may be coupled via fasteners 362 disposed through a first set of fastener apertures 364 in the cover portion 360 and the base portion 358. Additional fasteners (not depicted) may also be disposed through a second set of fastener apertures 366 for coupling the assembly 300 with the wheel assembly.

Preferably, the base portion 358 is formed of a rigid material. In certain embodiments, the base portion 358 may be formed by machining a metal. Processes utilized to form the base portion 358 may create openings in the base portion 358 that may need to be sealed in order for the assembly 300 to function as intended. To seal the openings, a plurality of plugs 367 may be attached to the based portion 358. Each plug 367 may be attached to the base portion 358 via a threaded connection or another method.

The tire port 370 is formed in an outer surface 368 of the base portion 358. The tire port 370 is in fluid communication with the tire and a second chamber 372 at least partially defined by the base portion 358. A diaphragm 374 is disposed in a third chamber 376 and between the base portion 358 and the cover portion 360. The diaphragm 374 is disposed proximate an orifice 378. Preferably, the base portion 358 and the diaphragm 374 define the second chamber 372. The second chamber 372 is in fluid communication with the orifice 378. The orifice 378 may be separated from the diaphragm 374 by a valve port 380. The second chamber 372 and the third chamber 376 are in selective fluid communication via the orifice 378, the valve port 380, and the diaphragm 374. The tire port 370 is in selective fluid communication with the fluid conduit 356 via the second chamber 372, the orifice 378, the valve port 380, the diaphragm 374, and the third chamber 376.

Preferably, the cover portion 360 is formed of a rigid material. In certain embodiments, the cover portion 360 may be metallic. The cover portion 360 at least partially houses a biasing member 382 and a backing plate 384. In a static state, the biasing member 382 engages a surface of the cover portion 360 and a surface of the backing plate 384. The backing plate 384 engages the diaphragm 374 and, via a force applied by the biasing member 382, urges the diaphragm 374 into sealing contact with a protuberance 386. The protuberance 386 may be provided as a portion of the base portion 358. The diaphragm 374 thereby seals the valve port 380, which prevents fluid communication between the tire port 370 and the third chamber 376.

During inflation, deflation, or pressure checks of the tire, pressurized fluid from the air supply 36 enters the third chamber 376 via the fluid conduit 356. The increased pressure in the third chamber 376 exerts a force on the diaphragm 374 in a direction which is opposite the force applied by the biasing member 382 to the diaphragm 374. Thereby, the biasing member 382 is at least partially compressed. Once the diaphragm 374 is urged away from the protuberance 386 it is in an open position. Once the diaphragm 374 is in the open position, tire pressure in the second chamber 372 maintains the diaphragm 374 and the protuberance 386 in a spaced apart relationship, which facilitates fluid communication between the tire port 370 and the fluid conduit 356. The tire port 370 may be in direct fluid communication with the tire or may be in fluid communication with the tire via a tube or hose (not depicted).

During a tire deflation, the valve 314 is in the second state and pressurized air from the tire enters the first portion 310 via the second portion 354. The pressurized air urges the valve 314 from the first state to the second state by lifting the valve 314 off of and away from the second distal end 340 of the exhaust stem 312. Thus, in the second state, the valve 314 is not in contact with the second distal end 340 of the exhaust stem 312. When the valve 314 lifts off of the exhaust stem 312 it forms a seal against an inner wall 388 of the first portion 310 which allows the pressurized air from the tire to be directed to atmosphere 390 via the exhaust stem 312. As the tire pressure is being decreased, a flow of pressurized air is from the air supply 36 is directed to the outer surface 344 of the valve 314 via the control conduit 306. The flow of pressurized air from the air supply 36 allows the valve 314 to provide a predetermined amount of back pressure in the fluid conduit 356 for maintaining the diaphragm 374 in the open position.

During a tire inflation, the valve 314 is in the first state. In the first state, pressurized air from the control conduit 306 acts on the outer surface 344 of the valve 314, which prevents the valve 314 from lifting off of the second distal end 340 of the exhaust stem 312. The pressurized air moves between the outer surface 344 of the valve 314 and the inner wall 388 and is directed to the second portion 354 via the fluid conduit 356.

The fluid conduit 356 is in fluid communication with the first portion 310 on an end and the second portion 354 on an opposite end. More particularly, the fluid conduit 356 is in fluid communication with third chamber 376 of the second portion 354. Pressurized air is directed through the fluid conduit 356 to the third chamber 376 when the tire pressure is being increased. When the tire pressure is being decreased, pressurized air is directed to the fluid conduit 356 from the tire via the third chamber 376. When pressurized air is directed through the fluid conduit 356 to the third chamber. 376 it applies a force to the diaphragm 374. The force provided by the pressurized air is utilized to counteract the force applied to the diaphragm 374 by the biasing member 382, which is illustrated best in FIG. 6B. When the force applied by the pressurized air is greater than the force applied provided by the biasing member 382, the diaphragm 374 is moved away from the orifice 378. Pressurized air is directed to and from the tire through the orifice 378. For example, when the tire pressure is being increased, pressurized air in the third chamber 376 is directed to the tire via the valve port 380, orifice 378, second chamber 372, and the tire port 370.

Figure 7:
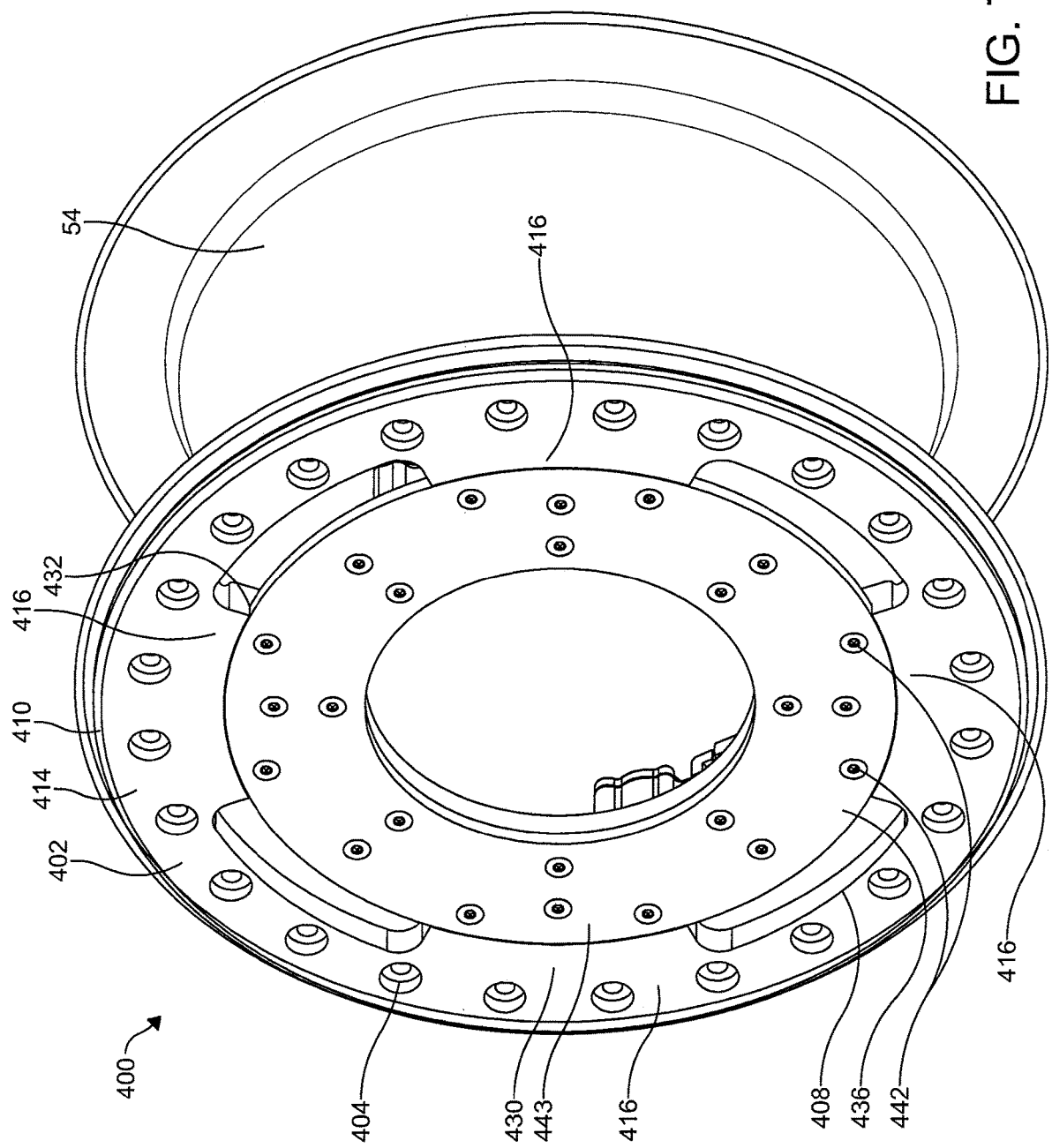
FIG. 7 is a isometric view of an embodiment of an assembly in accordance with the invention.
Figure 8:
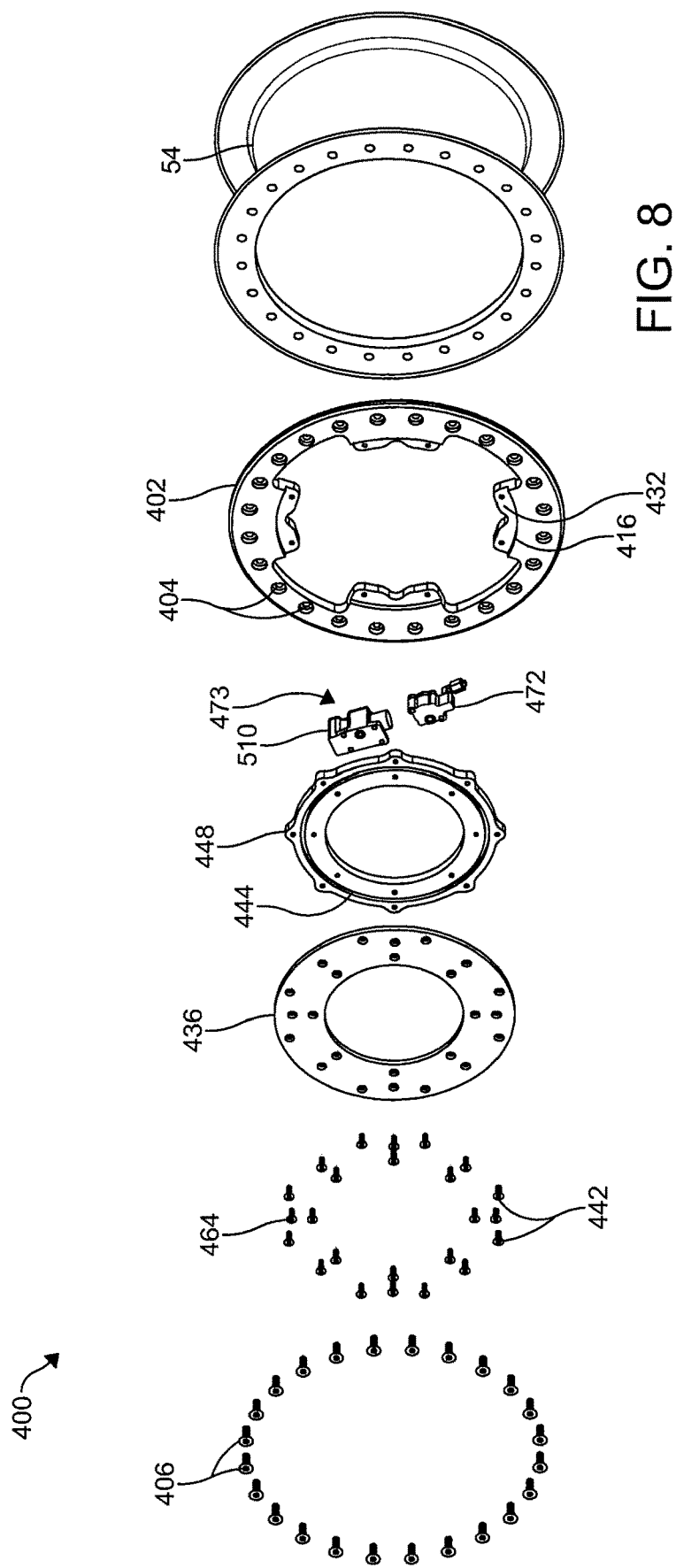
FIG. 8 is an exploded view of a portion of the assembly of FIG. 7.
Figure 9:
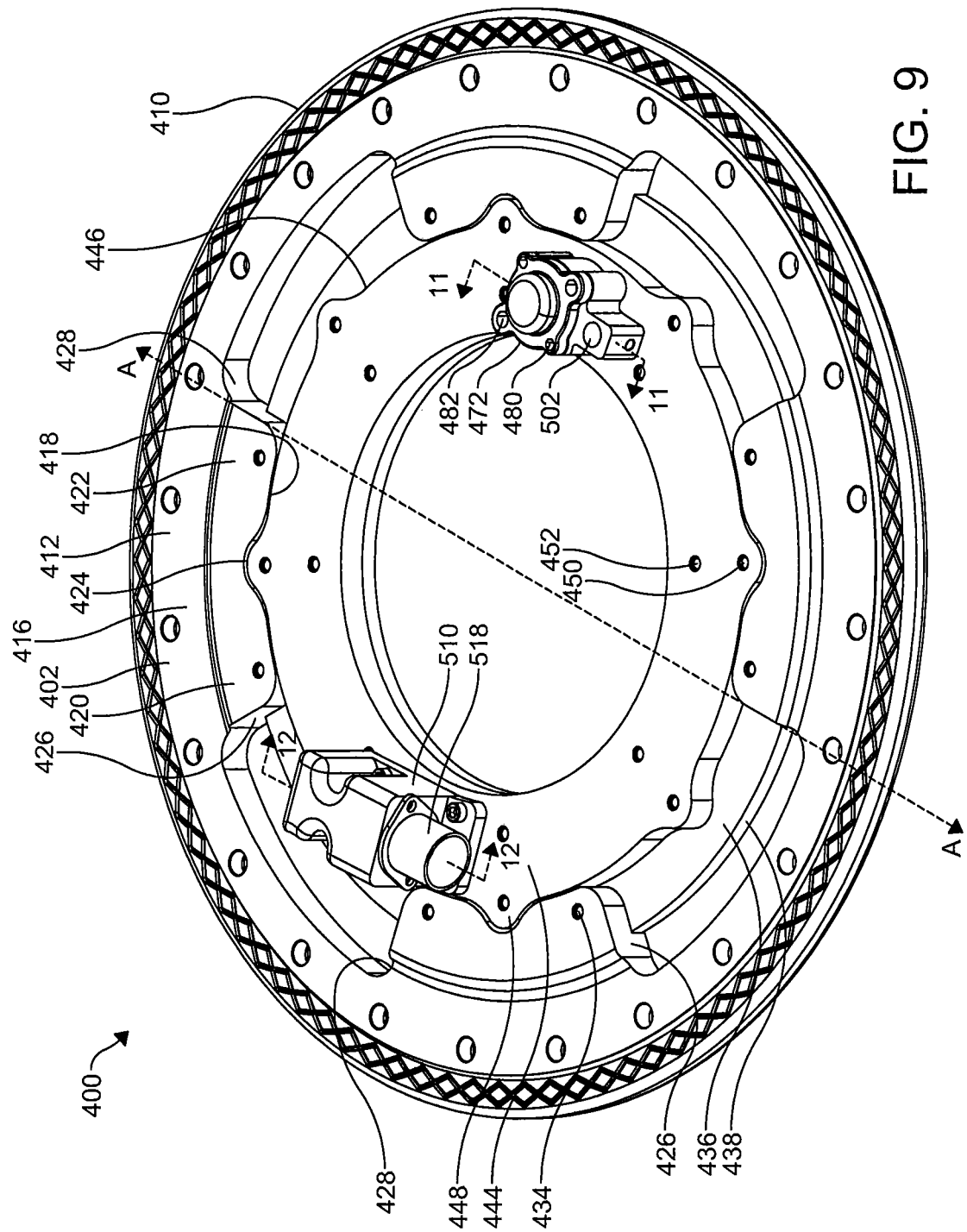
FIG. 9 is a isometric view of the assembly of FIG. 7.
Figure 10:
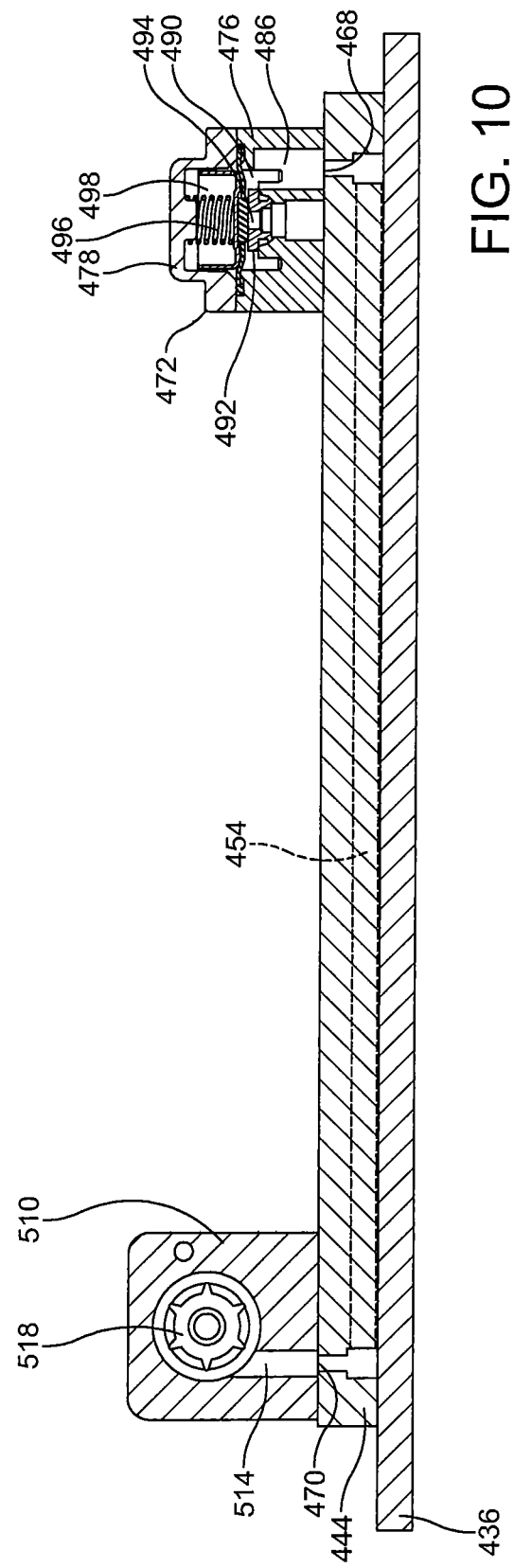
FIG. 10 is a partial sectional view of a portion of the assembly of FIG. 7.

Referring now to FIGS. 7-9, in some embodiments, the assembly 200, 400 may be coupled with a wheel rim 54, which is illustrated in FIG. 7. In other embodiments, like the one illustrated in FIG. 8, the ring portion comprises a first ring 402. The first ring 402 may comprise a plurality of fastener apertures 404 disposed axially therethrough. In an embodiment, the fastener apertures 404 may be equally spaced apart about the first ring 402. A plurality of fasteners 406 may be disposed through the fastener apertures 404 to couple the first ring 402 with the wheel rim 54. The first ring 402 comprises an inner surface 408 and an outer surface 410. The inner surface 408 comprises a diameter less than the diameter of the outer surface 410. The first ring 402 also comprises an inboard surface 412 and an outboard surface 414.

In an embodiment, the first ring 402 may also comprise one or more projections 416. As illustrated in FIGS. 7-9, in an embodiment, the first ring 402 may comprise four projections 416. Preferably, each projection 416 extends away from the inner surface 408. In an embodiment, each projection 416 may comprise an inner surface 418. The inner surface 418 may be of a generally arcuate shape. Each projection 416 may comprise a first section 420 and a second section 422. The first section 420 and the second section 422 may define a recess 424. The recess may form a portion of the inner surface 418 of each projection 416.

As illustrated in FIG. 9, each projection 416 may also comprise a second surface 426 and a third surface 428. The second surface 426 of two oppositely disposed tabs 416 may generally lie along the same line A-A. The third surface 428 of two oppositely disposed tabs 416 may be similarly disposed in a shared plane. Additionally, an outboard surface 430 of each projection 416 may comprise a recess 432, which is illustrated best in FIG. 8. The recess 432 may extend in an axial direction and be of a depth which is less than the thickness of the corresponding projection 416. One or more fastener apertures 434 may be disposed through each of the first section 420 and the second section 422, and extend through the recess 432.

As illustrated in FIGS. 7-9, the ring portion may comprise a second ring 436. The second ring 436 may comprise an outer surface 438 having a diameter less than the inner surface 408 of the first ring 402. The second ring 436 may comprise a plurality of fastener apertures 440, which are labelled in FIG. 14, extending axially therethrough. The plurality of fastener apertures 440 may be disposed about the second ring 436 at positions that axially align with corresponding fastener apertures 434 of the first ring projections 416. The second ring 436 may be received in the recesses 432 of the first ring projections 416 and coupled with the projections 416 via fasteners 442 disposed through fastener apertures 434, 440. When coupled with the projections 416, an outboard surface 443 of the second ring 436 may be aligned with the first ring outboard surface 414.

With continued reference to FIGS. 7-9, the ring portion may comprise a third ring 444. The third ring 444 may comprise an outer surface 446 having a diameter less than the outer surface 438 of the second ring 436. In an embodiment, the third ring 444 may comprise a plurality of protuberances 448 extending out from the outer surface 446 thereof. Preferably, each protuberance 448 is disposed in a recess 424 defined by the first section 420 and the second section 422. The protuberances 448 and the recesses 424 facilitate positioning the third ring 444 relative to the first ring 402. A first set of fastener apertures 450 may be disposed through the third ring 444. The first set of fastener apertures 450 may be at least partially disposed through the protuberances 448. A second set of fastener apertures 452 may also be disposed through the third ring 444. Each fastener aperture 452 of the second set of fastener apertures may disposed radially in from a corresponding fastener aperture 450 of the first set of fastener apertures. The second ring 436 may comprise fastener apertures 466 that are aligned with the apertures 450, 452 of the first and second sets of fastener apertures of the third ring 444. Fasteners 442, 464 disposed through the fastener apertures 440, 450, 452, 466 couple the third ring 444 with the second ring 436.

Figure 13:
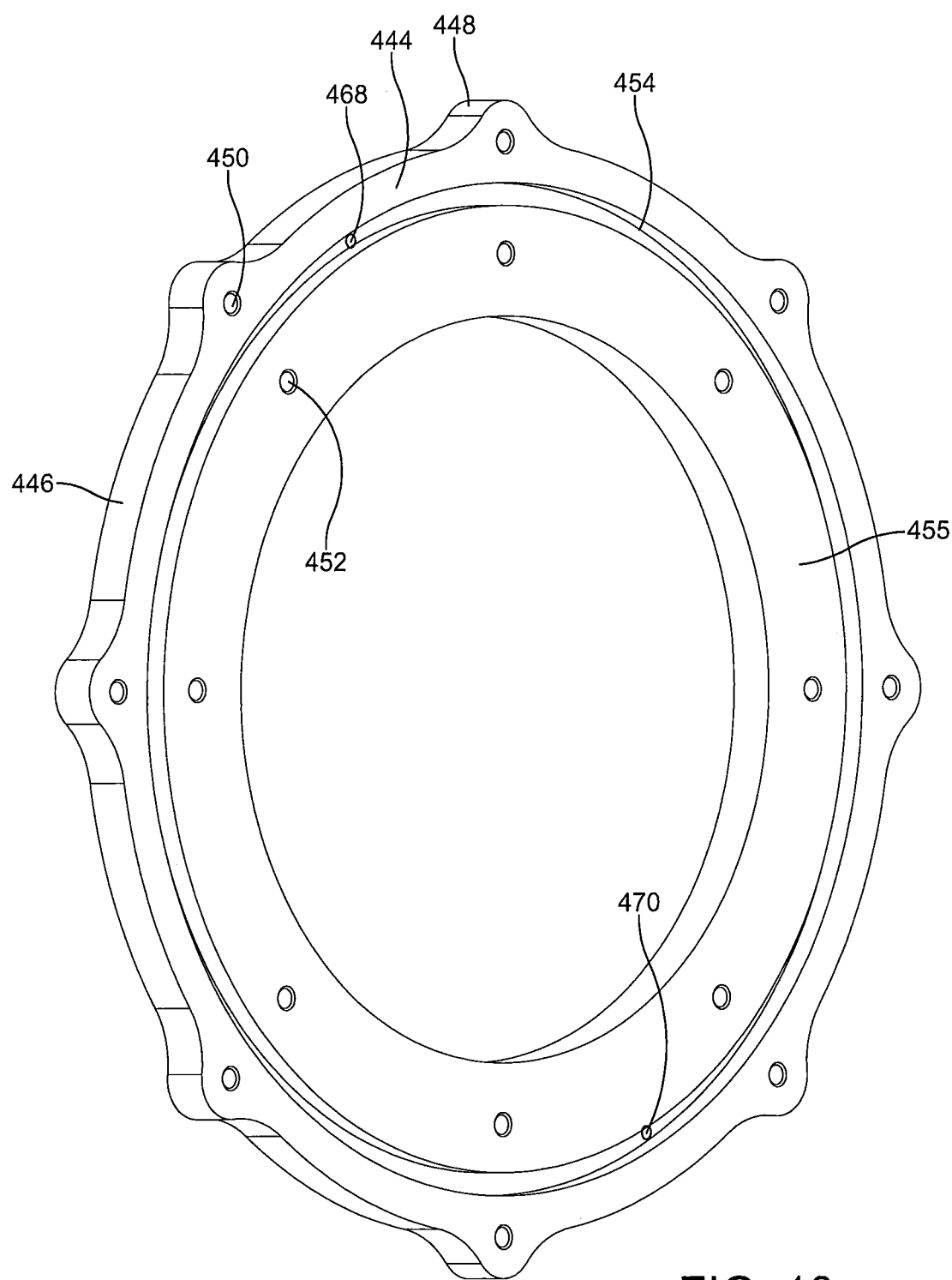
FIG. 13 is a isometric view of a portion of the assembly of FIG. 7.
Figure 14:
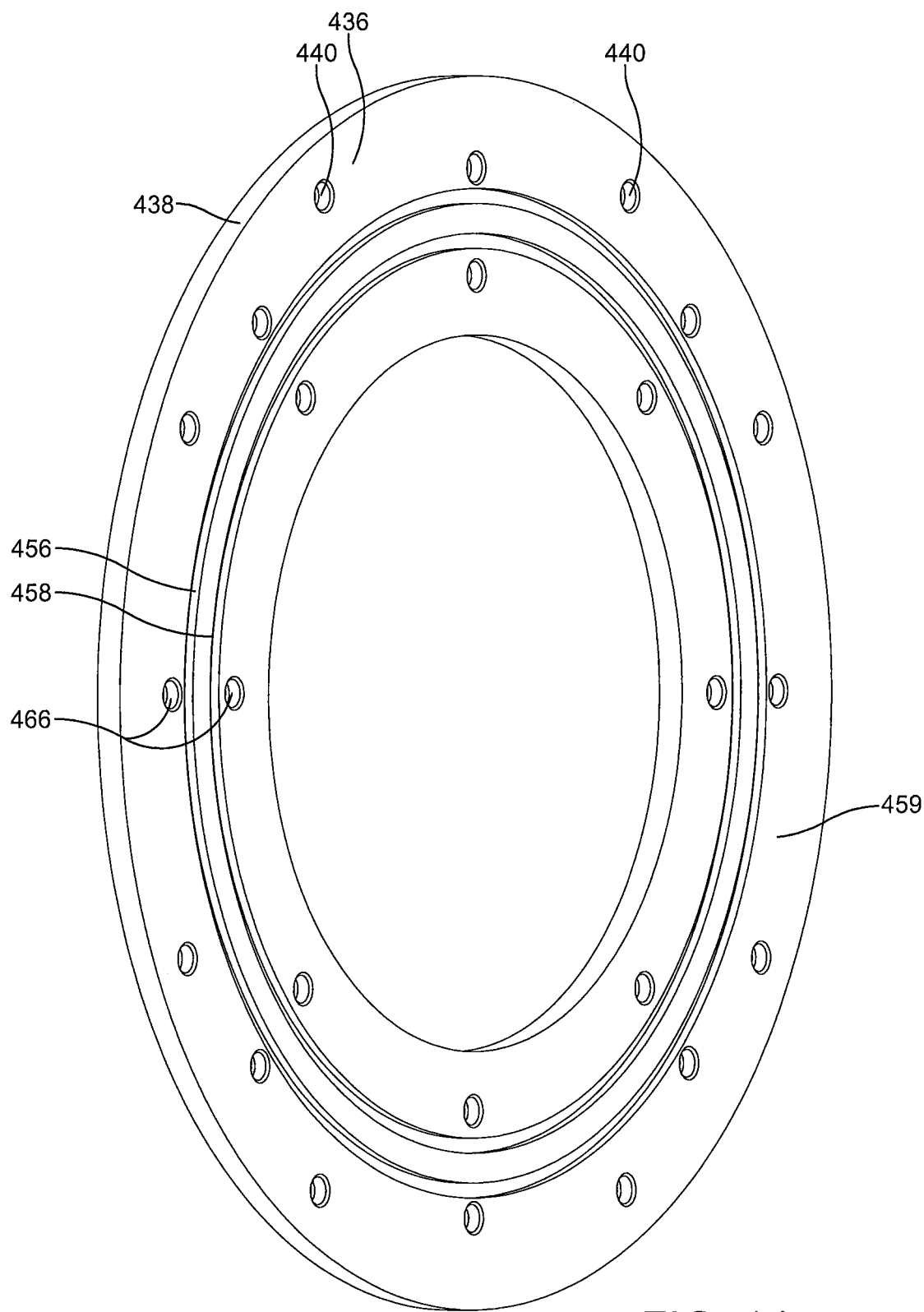
FIG. 14 is a isometric view of a portion of the assembly of FIG. 7.

As illustrated best in FIG. 13, the assembly 400 may comprise a fluid conduit 454. In an embodiment, the fluid conduit 454 may be partially defined by an annular groove disposed in the outboard surface 455 of the third ring 444. The fluid conduit 454 may be of a circular shape. In this embodiment, the annular groove is of a circular shape. In some embodiments, the fluid conduit 454 is disposed radially between the first and second sets of fastener apertures 450, 452 in the third ring 444. As illustrated in FIG. 14, the second ring 436 may comprise concentric grooves 456, 458 in an inboard surface 459 thereof. First and second seals (not depicted) may be disposed in the grooves 456, 458, respectively. When the third ring 444 is coupled with the inboard surface 459 of the second ring 436, the seals seal against the outboard surface 455 of the third ring 444 and seal the fluid conduit 454. In an embodiment, the fluid conduit 454 may be defined by the annular groove in the third ring 444, the second ring 436, and the seals in the second ring grooves 456, 458. In an embodiment, the seals are O-ring seals.

Figure 11:
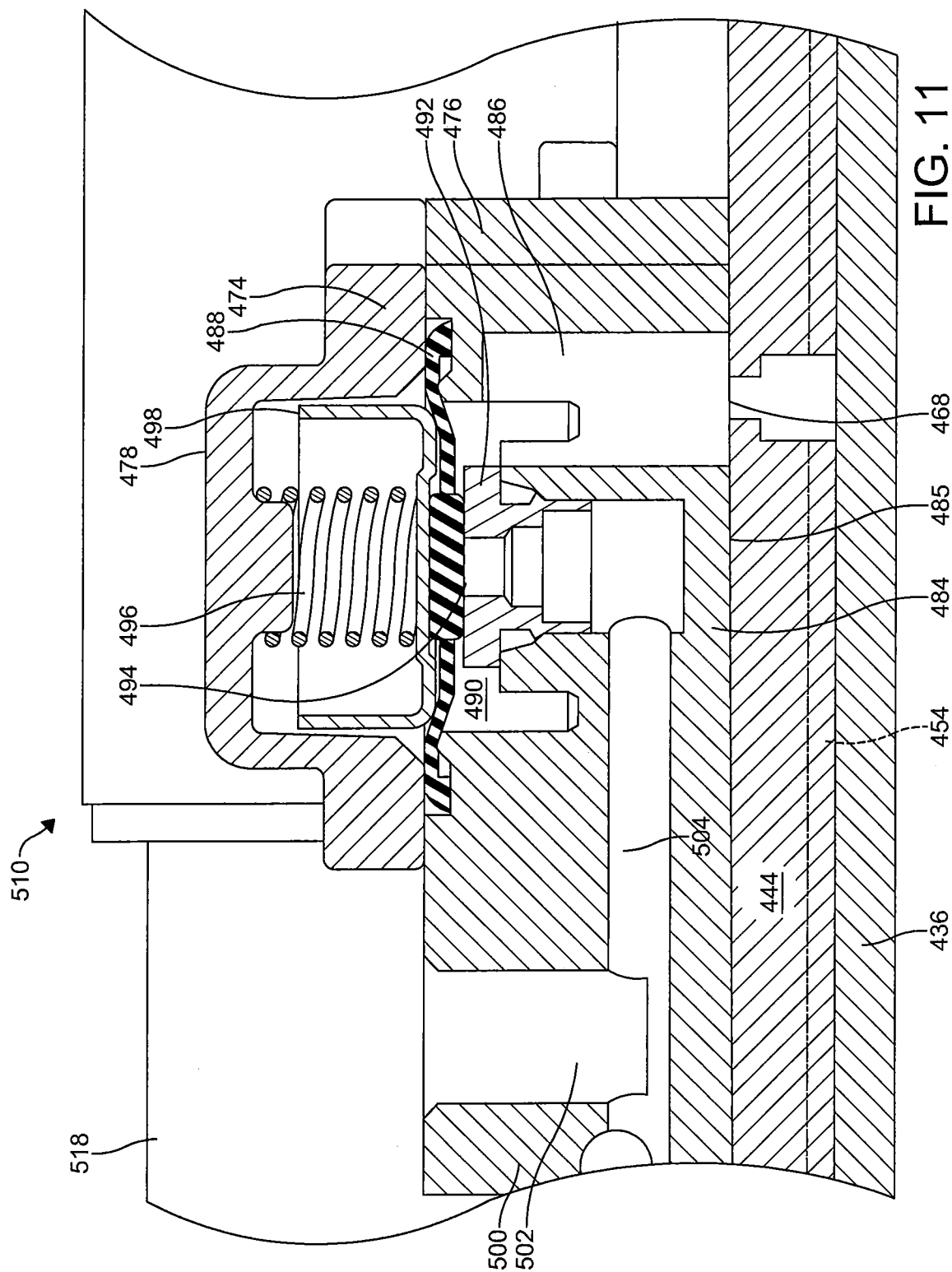
FIG. 11 is an enlarged sectional view of a portion of FIG. 10.

Referring back to FIG. 13, the third ring 444 may comprise a first port 468 and a second port 470. Each port 468, 470 is disposed through the inboard surface of the third ring 444 and communicates with the fluid conduit 454. Referring now to FIGS. 9 and 11, a first portion 472 of the valve assembly 473 may be coupled with the third ring 444. The first portion 472 may comprise a valve body 474 having a base portion 476 and a cover portion 478. The base portion 476 and the cover portion 478 may be coupled via fasteners (not depicted) disposed through a first set of fastener apertures 480 in the cover portion 478 and the base portion 476. Additional fasteners (not depicted) may also be disposed through the second set of fastener apertures 482 for coupling the first portion 472 of the valve assembly 473 with the third ring 444.

The base portion 476 comprises an outboard surface 484 coupled with the inboard surface 485 of the third ring 444. The outboard surface 484 comprises an inlet 486. The inlet 486 is in fluid communication with the first port 468 of the fluid conduit 454. A diaphragm 488 is disposed between the base portion 476 and the cover portion 478. The base portion 476 and the diaphragm 488 define a first chamber 490. The base portion 476 also comprises a protuberance 492 extending into the first chamber 490. The protuberance 492 may be generally cylindrical. In an embodiment, the protuberance 492 is formed in a unitary manner with the remaining portions of the base portion 476. In other embodiments, the protuberance may be formed as separate portions. In one such embodiment, a first portion of the protuberance 492 may be formed in a unitary manner with the remaining portions of the base portion 476 and a second portion of protuberance 492 may be secured to the first portion via a threaded connection or in another manner. The protuberance 492 defines a port 494 disposed generally coaxially therewith. The port 494 is in selective fluid communication with the inlet 468 via the first chamber 490 and the diaphragm 488.

As best illustrated in FIG. 11, the cover portion 478 at least partially houses a biasing member 496 and a backing plate 498. In a rest state, the biasing member 496 engages a surface of the cover portion 478 and a surface of the backing plate 498. The backing plate 498 engages the diaphragm 488 and, via the biasing member 496, urges the diaphragm 488 into sealing contact with a portion of the protuberance 492. The diaphragm 488 thereby seals the port 494.

The base portion 476 may also comprise a radial extension 500. The extension 500 comprises an outlet 502. The outlet 502 is in fluid communication with the port 494 via a fluid channel 504. The fluid channel 504 is disposed through the extension 500. The outlet 502 is in selective fluid communication with the inlet 486 via the diaphragm 488. During inflation, deflation, or pressure checks of the tire 50, pressurized fluid enters the first chamber 490 via the inlet 486. The increased pressure in the first chamber 490 exerts a force on the diaphragm 488 and thereby at least partially compresses the biasing member 496. The increased pressure in the first chamber 490 urges the diaphragm 488 away from the protuberance 492 and facilitates fluid communication between the inlet 486 and the outlet 502. The outlet 502 is in fluid communication with the tire 50 via a tube or hose (not depicted).

Figure 12:
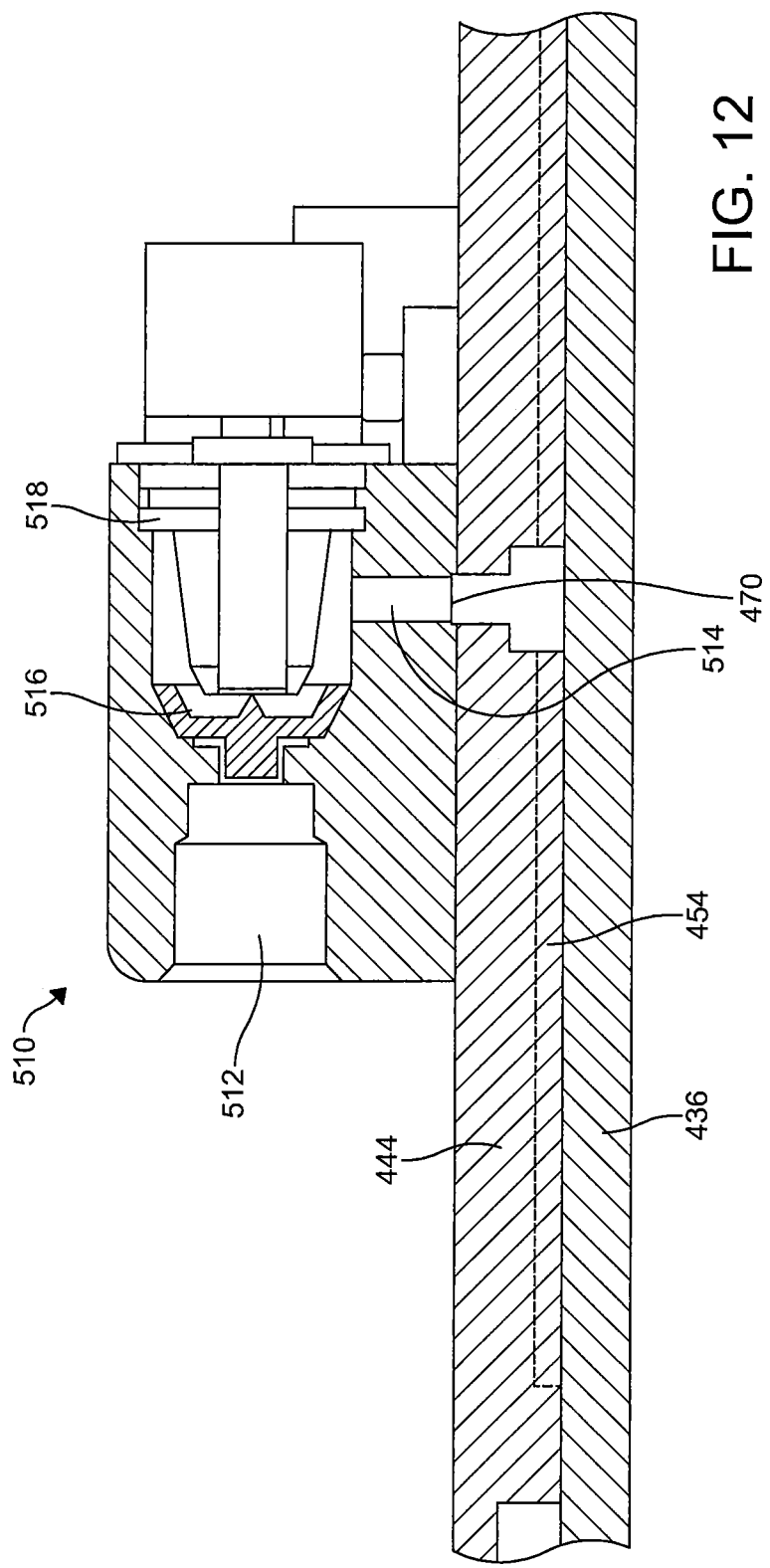
FIG. 12 is a partial cross-sectional view of a portion of the assembly of FIG. 7.

Referring now to FIGS. 9 and 12, in an embodiment, the second portion 510 of the valve assembly 473 is coupled with the third ring 444. In this embodiment, the second portion 510 comprises an inlet 512. The inlet 512 is in fluid communication with the air supply 36 via the fluid control circuit 40. Preferably, the inlet 512 is in fluid communication with the fluid control circuit 40 via a tube or hose (not depicted). The tube or hose may be in fluid communication with a wheel end rotary joint 1000. The second portion 510 may also comprise a conduit 514 in fluid communication with the third ring second port 470. The conduit 514 is in selective fluid communication with the inlet 512 via a valve 516. The valve 516 is moveable and operates in a first state and a second state. The valve 514 may be configured as described above for the valve 314 illustrated best in FIGS. 6C-6E. The second portion 510 may further comprise an exhaust stem 518 in fluid communication with the atmosphere. The exhaust stem 518 may be configured as described above for the exhaust stem 312 illustrated best in FIGS. 6A-6E.

The exhaust stem 518 is in selective fluid communication with the fluid conduit 514 via the valve 516. The exhaust stem 518 provides a vent to atmosphere that can be utilized to control back pressure. Having a vent to atmosphere disposed at the wheel end of the fluid control circuit 40 is beneficial in quickly removing undesirable back pressure in the fluid control circuit 40. Fluid control circuits only having a vent to atmosphere at a control unit may experience undesirable back pressure which may shorten the life-span of tire inflation system components. Back pressure in the fluid control circuit 40 may also prevent the valve 516 from closing when desired. By removing the back pressure in the fluid control circuit 40, the valve 516 is capable of closing at higher tire pressures.

With reference to FIGS. 1 and 7-13, during inflation, deflation, or pressure checks of the tire 50, pressurized air from the air supply 36 is communicated through the rotary joint 1000 to the valve assembly inlet 512. The increased pressure in the valve assembly inlet 512 acts on the valve 516 so that it seals against the exhaust stem 518. When the valve 516 is sealed against the exhaust stem 518 it is in the first state. The pressurized air is then communicated to the port 514 and into the fluid conduit 454. The pressurized air is communicated through the fluid conduit 454 to the first portion inlet 486. The increased pressure in the first chamber 490 exerts a force on the diaphragm 488, which is opposite the force applied by the biasing member 496 to the diaphragm 488. Thereby, the biasing member 496 is at least partially compressed. Once the diaphragm 488 is urged away from the port 494 it is in an open position, which allows pressurized air to be communicated through the port 494 and the fluid channel 504 to the first portion outlet 502. The pressurized air in the fluid channel 504 maintains the diaphragm 488 and the port 494 in a spaced apart relationship during inflation. From the first portion outlet 502, the pressurized air is communicated to the tire 50. Communication from the first portion outlet 502 to the tire 50 may be through a tube or hose.

During a tire deflation, pressurized air from the tire 50 enters the valve assembly 473 via the first portion 472. The pressurized air urges the valve 516 from the first state to the second state by lifting the valve 516 off of and away from the exhaust stem 518. In the second state, the valve 516 is not in contact with the exhaust stem 518. When the valve 516 lifts off of the exhaust stem 518 it forms a seal against an inner wall of the valve assembly 473 which allows the pressurized air from the tire 50 to be directed to the atmosphere via the exhaust stem 518. As the tire pressure is being decreased, a flow of pressurized air is from the air supply 36 is directed to the outer surface of the valve 516 via the inlet 512. The flow of pressurized air from the air supply 36 allows the valve 516 to provide a predetermined amount of back pressure in the fluid conduit 454 for maintaining the diaphragm 488 in the open position.

During a tire inflation, the valve 516 is in the first state. In the first state, pressurized air from the inlet 512 acts on the outer surface of the valve 516, which allows the valve 516 to seal against the exhaust stem 518. The pressurized air moves between the outer surface of the valve 516 and the inner wall and is directed to the first portion 472 via the fluid conduit 454. Pressurized air is directed through the fluid conduit 454 to the first chamber 490 when the tire pressure is being increased. When the tire pressure is being decreased, pressurized air is directed to the fluid conduit 454 from the tire 50 via the first chamber 490. When pressurized air is directed through the fluid conduit 454 to the first chamber 490 it applies a force to the diaphragm 488. The force provided by the pressurized air is utilized to counteract the force applied to the diaphragm 488 by the biasing member 496. When the force applied by the pressurized air is greater than the force applied provided by the biasing member 496, the diaphragm 488 is moved away from the port 494. Pressurized air is directed to and from the tire 50 through the port 494. For example, when the tire pressure is being increased, pressurized air in the first chamber 490 is directed to the tire 50 via the port 494, outlet 502, and fluid channel 504.

The terms "inboard" and "outboard" are utilized herein to describe the relative disposition of the features of the assembly 200, 400. It is within the consideration of the present disclosure that the position of the assembly for a tire inflation system 200, 400, or any features thereof may be, oriented such that features described as "inboard" or "outboard" may be reversed.

One or more embodiments described supra may be combined to create additional embodiments which are not depicted. While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

The invention claimed is:

1. An assembly for a tire inflation system, comprising:
   a ring portion having an outer surface and an inner surface, wherein a first projection and a second projection each extend from the inner surface; and
   a valve assembly connected to the ring portion and disposed in from the outer surface;
   wherein the valve assembly is disposed within a space at least partially defined by a wheel rim and the ring portion.

2. The assembly of claim 1, wherein the first projection and the second projection are circumferentially spaced apart along the inner surface.

3. The assembly of claim 1, wherein the valve assembly comprises a first portion and a second portion, the first portion coupled with the first projection and the second portion coupled with the second projection.

4. The assembly of claim 1, further comprising a center portion with a first end attached to the first projection and a second end attached to the second projection.

5. The assembly of claim 1, wherein the ring portion comprises a first ring that defines the outer surface, a second ring that is coupled to the first projection and the second projection, and a third ring that is coupled to the second ring, wherein the valve assembly is coupled to the third ring.

6. The assembly of claim 1, wherein the ring portion is coupled to the wheel rim.

7. The assembly of claim 2, wherein the first projection and the second projection extend toward each other.

8. An assembly for a tire inflation system, comprising:
   a ring portion having an outer surface and an inner surface, wherein a first projection and a second projection each extend from the inner surface; and
   a valve assembly connected to the ring portion and disposed in from the outer surface;
   wherein the valve assembly comprises a first portion and a second portion, the first portion coupled with the first projection and the second portion coupled with the second projection; and
   wherein the first portion and the second portion are in fluid communication.

9. The assembly of claim 4, wherein the valve assembly is coupled to the center portion.

10. The assembly of claim 4, wherein the center portion has a first radially extending projection and a second radially extending projection, the first radially extending projection being received in a recess formed in the first projection and the second radially extending projection being received in a recess formed in the second projection.

11. An assembly for a tire inflation system, comprising:
   a ring portion having an outer surface and an inner surface, wherein a first projection and a second projection each extend from the inner surface; and
   a valve assembly connected to the ring portion and disposed in from the outer surface, wherein the ring portion is coupled to a wheel rim, and
   wherein the valve assembly comprises:
   i. a housing having a control port and a tire port;
   ii. a first portion at least partially disposed within the housing and in fluid communication with the control port, the first portion comprising a valve, wherein the valve prevents fluid communication between the control port and an outlet in a first state and permits fluid communication between the tire port and the outlet in a second state, and
   iii. a second portion disposed in the housing and proximate an orifice, the orifice being in fluid communication with the tire port, wherein the second portion prevents fluid communication between the tire port and the first portion or permits fluid communication between the tire port and the first portion.

12. The assembly of claim 8, wherein the first portion and the second portion are in fluid communication via a fluid conduit formed within the ring portion.

* * * * *